United States Patent [19]

Seyler

[11] Patent Number: 5,255,363
[45] Date of Patent: Oct. 19, 1993

[54] GRAPH-BASED PROGRAMMING SYSTEM AND ASSOCIATED METHOD

[75] Inventor: Mark R. Seyler, Portland, Oreg.

[73] Assignee: Mentor Graphics Corporation, Wilsonville, Oreg.

[21] Appl. No.: 540,610

[22] Filed: Jun. 19, 1990

[51] Int. Cl.⁵ .............................................. G06F 15/20
[52] U.S. Cl. .................................... 395/164; 395/146; 395/149; 395/159; 345/185
[58] Field of Search ............... 395/145, 146, 148, 149, 395/156, 155, 159, 164, 162, 161; 340/799

[56] References Cited

U.S. PATENT DOCUMENTS

| | | | |
|---|---|---|---|
| 4,901,221 | 2/1990 | Kodosky et al. | 395/159 |
| 4,914,568 | 4/1990 | Kodosky et al. | 395/275 |
| 4,933,879 | 6/1990 | Ando et al. | 395/164 |
| 5,021,973 | 6/1991 | Hernandez et al. | 395/161 |
| 5,033,009 | 7/1991 | Dubnoff | 395/161 |
| 5,093,907 | 3/1992 | Hwong et al. | 395/152 |

Primary Examiner—Dale M. Shaw
Assistant Examiner—Kee M. Tung
Attorney, Agent, or Firm—Klarquist Sparkman Campbell Leigh & Whinston

[57] ABSTRACT

A graphical programming system with a spreadsheet base for enabling users to create graphical programs for displaying and manipulating data. The system architecture supports direct entry of information into cells and cell extension to display all information entered into a cell in one view. The architecture further supports modified formulas known as actions that execute only after being independently initiated by a user or another process. Conditional functions known as "watchers" are also provided. Watchers contain procedures to perform and permit a program created with the system to monitor data and respond to it. For ease of understanding, information within cells may be represented graphically by objects such as buttons and meters. The objects may be user-designed or provided by the programming system. They are selected via pop-up menus and list windows within the system's user interface.

10 Claims, 10 Drawing Sheets

GRAPH-BASED PROGRAMMING SYSTEM AND ASSOCIATED METHOD

TECHNICAL FIELD

This invention relates to graphical programming systems. More particularly, this invention relates to a spreadsheet-based graphical programming system. The system allows a user to easily create his own graphical programs, such as interfaces for monitoring data generated by various software tools during the design of an electronic system.

BACKGROUND OF THE INVENTION

Electronic design automation (EDA) incorporates the use of powerful computer programs known as software "tools" for the design, simulation and testing of electronic systems before they are actually constructed. Such tools include schematic editors for creating circuit designs, simulators for simulating a circuit's operation, programs for board or chip layout of a circuit and so forth.

Each of these tools generates data regarding the proposed electronic system under design. It is often desirable to compare the data from various tools to create an optimum design. For example, cost data for a proposed electronic system must be considered in the final system design. Similarly, statistical reliability data on components proposed for the electronic system can influence the logic design.

Traditionally, such data comparison has been done manually after a user has finished working with a tool. This sequential approach has the obvious drawbacks of being time-consuming, unreliable, and likely to cause costly redesigns. These drawbacks increase in magnitude as the size of the electronic system under design grows.

The present invention provides a solution through concurrent design. It allows designers to create graphical programs that can monitor parameters such as cost and reliability and provide visual feedback during the design process.

SUMMARY OF THE INVENTION

An object of the invention, therefore, is to provide an easy-to-use graphical programming system for creating graphical programs such as interfaces.

Another object of the invention is to provide such a programming system with a grid or spreadsheet base.

Yet another object of the invention is to provide such a programming system which supports conditional functions for monitoring data.

The foregoing and other objects, features, and advantages of the invention will become more apparent from the following detailed description of the preferred embodiments which proceeds with reference to the accompanying drawings.

BRIEF DESCRIPTION OF THE DRAWINGS

FIG. 9 is a screen display illustrating the presence of a conditional function in a memory element of the programming system.

FIG. 10 is a screen display of a completed graphical program created with the graphical programming system.

DETAILED DESCRIPTION

The following described embodiment of the invention is a computer program presently implemented in C++, an object oriented programming language. The program is designed to run on conventional computer systems, such as are available from Apollo Computer Co., which include a video terminal, computer with memory, keyboard and mouse. For the purpose of fully describing the embodiment, reference will be made to elements of the C++ language. It should be understood, however, that the invention is not limited to this embodiment. Based on the following description, the invention could as well be implemented equivalently by one skilled in the art in a number of high level programming languages, including C and Pascal, or in embodiments other than software.

To focus this description on the invention itself, conventional elements of program design such as single-linked lists, depth-first searching, class structures, recursive-descent parsers and so forth will not be described in depth. These elements are well understood in the art and are fully described in works such as *The C++ Programming Language* by B. Stroustrup, Addison-Wesley Publishing Co. (1987); *Data Structures: with Abstract Data Types and Pascal* by D. Stubbs et al, Brooks/Cole Publishing Co. (1985); *Algorithms* by R. Sedgewick, Addison-Wesley Publishing Co. (1988); and *Algorithms+ Data Structures=Programs* by N. Wirth, Prentice-Hall (1976). These works are hereby incorporated by reference.

System Architecture

Figure 1:
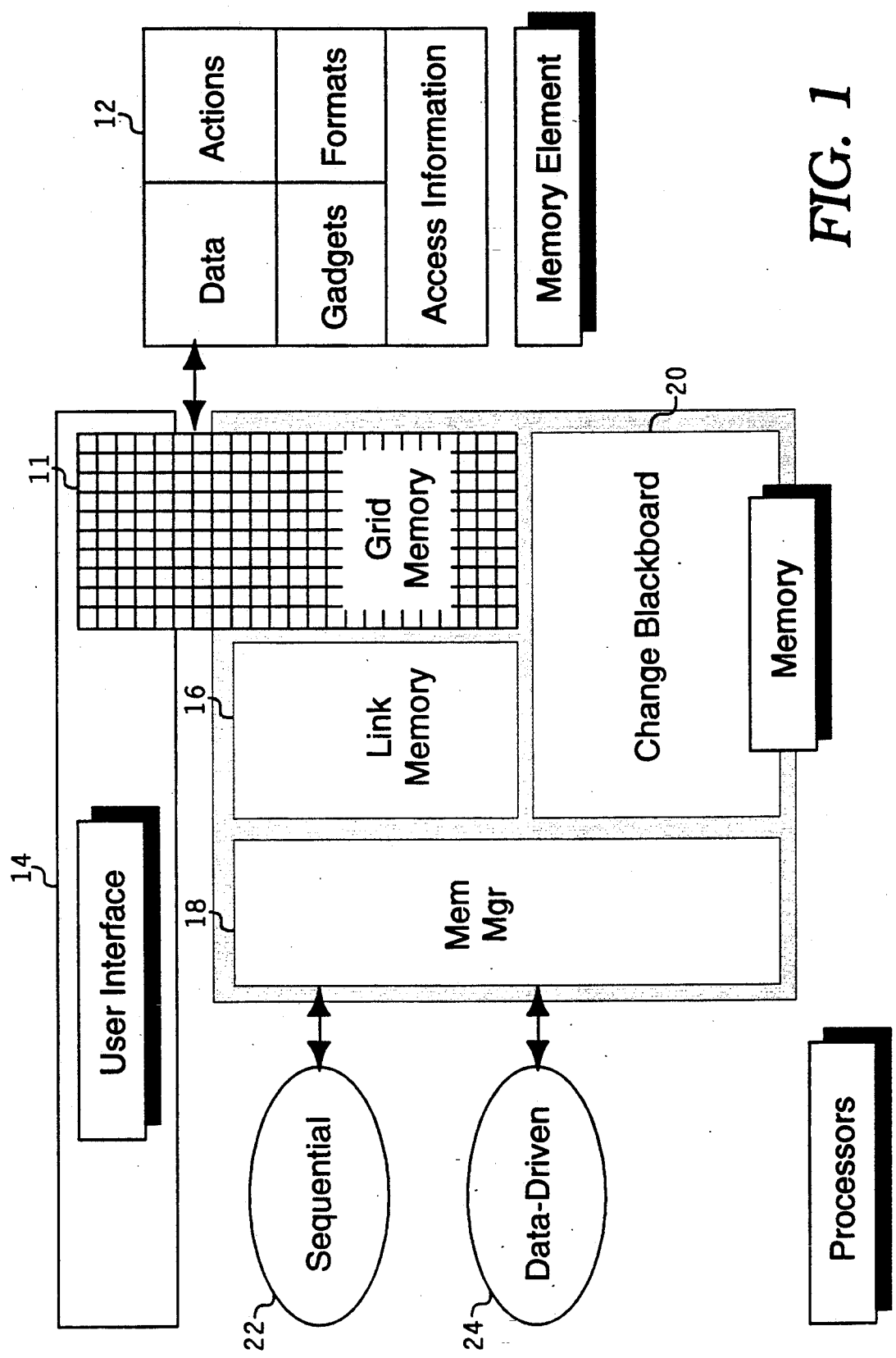
FIG. 1 is a block diagram of the architecture of a graphical programming system according to the invention.

FIG. 1 shows the system architecture of a graphical programming system according to the invention. The system includes a grid memory 11 that forms a two-dimensional array of memory elements 12. Memory elements are also referred to as "cells" and the two terms are used interchangeably herein. As illustrated, each memory element 12 is capable of storing information such as data, "actions," "gadgets," formats and access information. Data may be entered into a cell or derived from a formula. Formulas in turn are composed of constants, references to cells, and functions. As will become clear from the following discussion, formulas are normally calculated immediately upon entry into a cell and become data. Actions, on the other hand, are formulas that are calculated only upon independent initiation by a user or a another process. Gadgets are graphical objects that represent data, and formats are variables that dictate the way information is displayed. The access information is a variable that stores the cell's CLOCK value. The function of the CLOCK value will be described in conjunction with the system's operation.

Each memory element 12 has a unique column-and-row address in grid memory 11, such as A1 for the upper left hand corner cell. Memory elements are implemented as C++ "class" structures, the equivalent of which exist in other languages such as a "struct" in C or a "record" in Pascal.

A user interface 14 is constructed in accordance with the OSF/MOTIF standards for graphical user interfaces described in *OSF/Motif Style Guide*, Open Software Foundation, Prentice-Hall (1990). Tools known as user interface management systems (UIMS) are widely available for creating such interfaces, such as TeleUSE from TeleSoft of San Diego, Calif. User interface 14 displays the grid memory 11 as a grid on the screen of a computer terminal, as will be shown, along with a set of menus, windows and buttons for manipulating the cells 12. The interface also includes a conventional utility that generates a cursor for user interaction, such as for selecting a displayed cell from the grid.

A link memory 16 stores connections made between cells 12. A connection is made through cell references to another cell, such as in the formula "=A1*2" stored within cell A2. Through this reference the value of cell A2 is linked to the value of cell A1. Multiple references in a formula are possible, and link memory 16 maintains a list of these connections for each memory element 12 within the grid memory 11.

When a user first enters information such as a number into a cell displayed on the grid, a memory manager 18 creates the cell in grid memory 11. The manager 18 then creates connections in link memory 16 if needed and records the information entry in a change blackboard 20. All changes to any information within a grid memory 11 or link memory 16 are stored in change blackboard 20, which comprises a single-linked list of cell references. For example, the entry of a number into a cell 12 would cause memory manager 18 to record the change in blackboard 20. The blackboard keeps track of such changes to minimize recalculations by a data-driven processor, whose operation will be described. The memory manager 18 is implemented as a C++ "class" structure.

Included in the graphical programming system are several virtual processors 22 and 24. These processors are programs that process the information entered into the grid memory 11 in separate ways. The sequential processor 22 executes actions entered into cells. The data driven processor 24 is invoked by the programming system after the user finishes entry of information or processor 22 concludes execution of an action. Processor 24 checks the change blackboard 20 for any changes to the information within a memory element 12. This is accomplished by analyzing the access information within the memory element. If a change is present, the data-driven processor calculates new values for all cells that refer to the changed cell. The processor 24 then clears the blackboard 20. The operation of both processors will be more fully explained hereafter.

Figure 2:
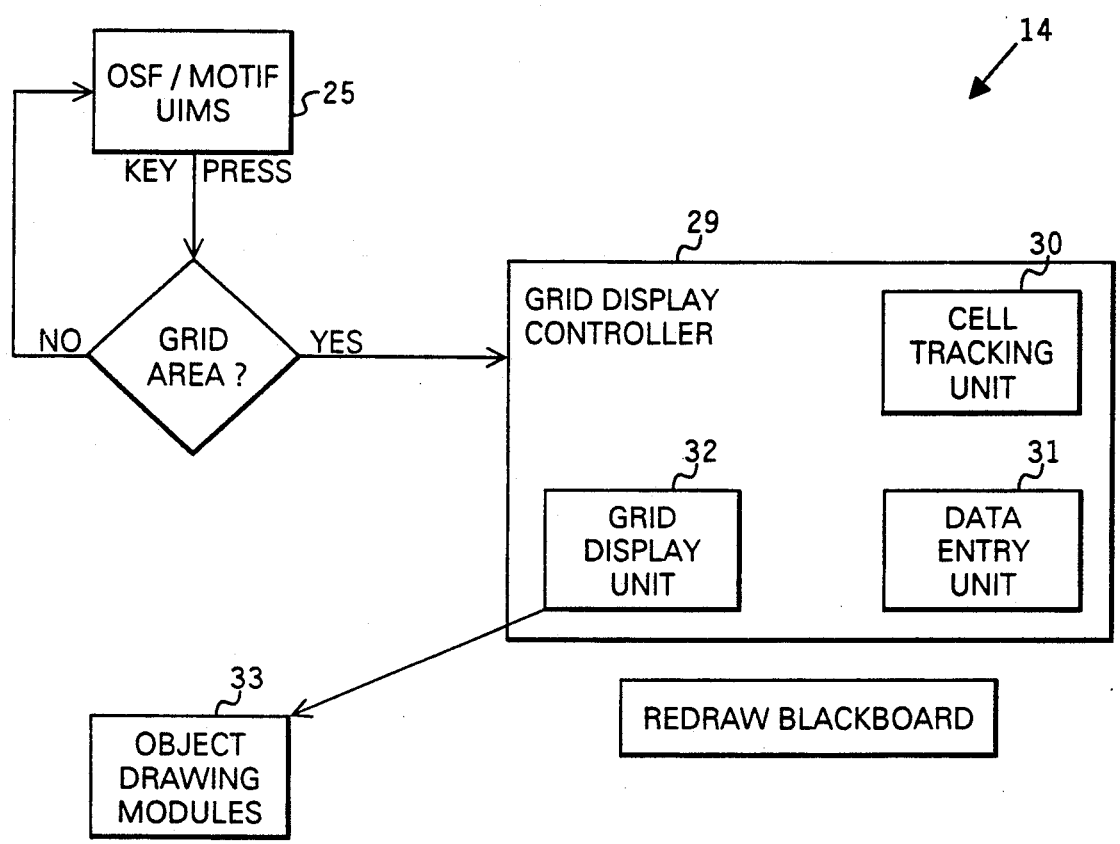
FIG. 2 is a lower level block diagram of the user interface block of FIG. 1.
Figure 4:
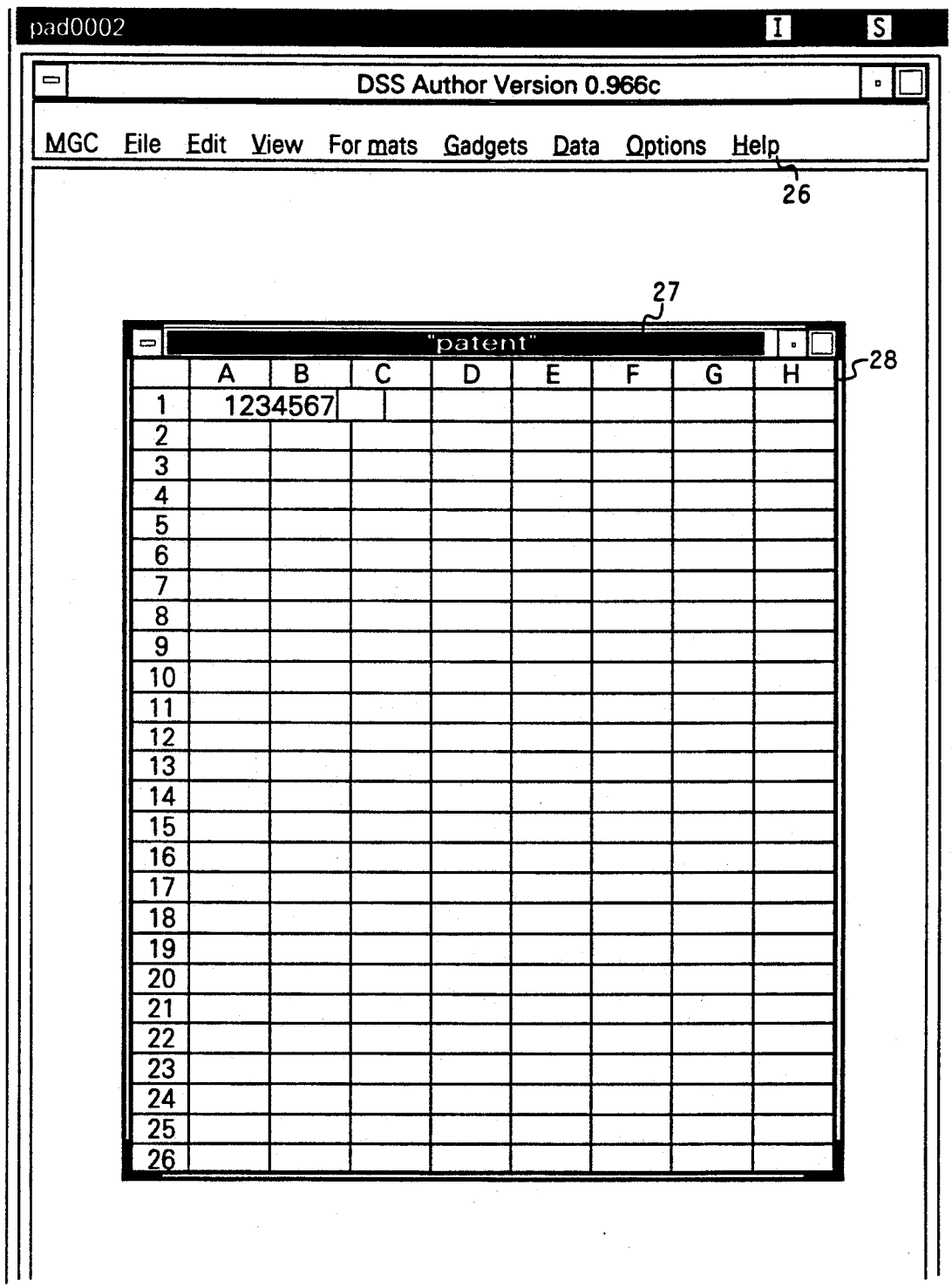
FIG. 4 is a screen display on a computer terminal illustrating the direct entry of information into a memory element of the graphical programming system.

FIG. 2 is a more detailed view of user interface 14. The interface includes a motif module 25 for displaying a menu bar 26, title/control bar 27 and vacant screen area (FIG. 4). Cursor or key selections that are made outside a grid 28 are handled by module 25. Within grid 28, selections are handled by a grid display controller module 29. The controller includes a cell tracking unit 30, a data entry unit 31 and a grid display unit 32. The grid display unit encompasses means for displaying the memory elements as a grid and for displaying options for manipulating the elements. The grid display unit 32 also calls object drawing modules 33 whenever a graphical object is to be added to the grid 28. The data entry unit 31 is a means for entering information directly into a selected memory element and for displaying the information as it is entered. The data entry unit also includes means for adjusting the display area of the memory element, if necessary, to provide for display of entered information within the area of the memory element. The cell tracking unit 30 provides a cursor for selecting a displayed memory element from the grid 28 and for displaying the cursor over the selected memory element as information is entered therein. As will be shown, the cell tracking unit positions the cursor over the displayed memory unit at the point where information is to be entered.

System Operation

Referring now to FIG. 4, there is shown a screen display with menu bar 26 positioned above grid 28. The grid 28 represents the cells of grid memory 11 and includes column and row addresses for each cell, such as A1 for the upper left hand corner cell. Within cell A1 appear numbers 1-7 followed by an I-beam shaped cursor. Information such as these numbers is entered directly into a selected cell, rather than at a command line outside the grid, via the data entry unit 31. To enter information, the cell tracking unit displays the cursor over the selected cell and the user then types information directly into the cell. The information is echoed back to the screen for display at the cursor location. In this embodiment, the cell tracking unit 30 positions the cursor at the point where information is to be entered. And unlike conventional grids that appear in spreadsheets, the area of a displayed cell does not remain constant as information is entered and displayed. Rather the grid display unit adjusts the area, if necessary, to provide for display of the entered information entirely within the cell area. For example, the area of cell A1 encompasses over twice its normal area through increased length. Once the information entry is completed by pressing the Return key, the area of the cell shrinks back to its normal size.

Figure 3:
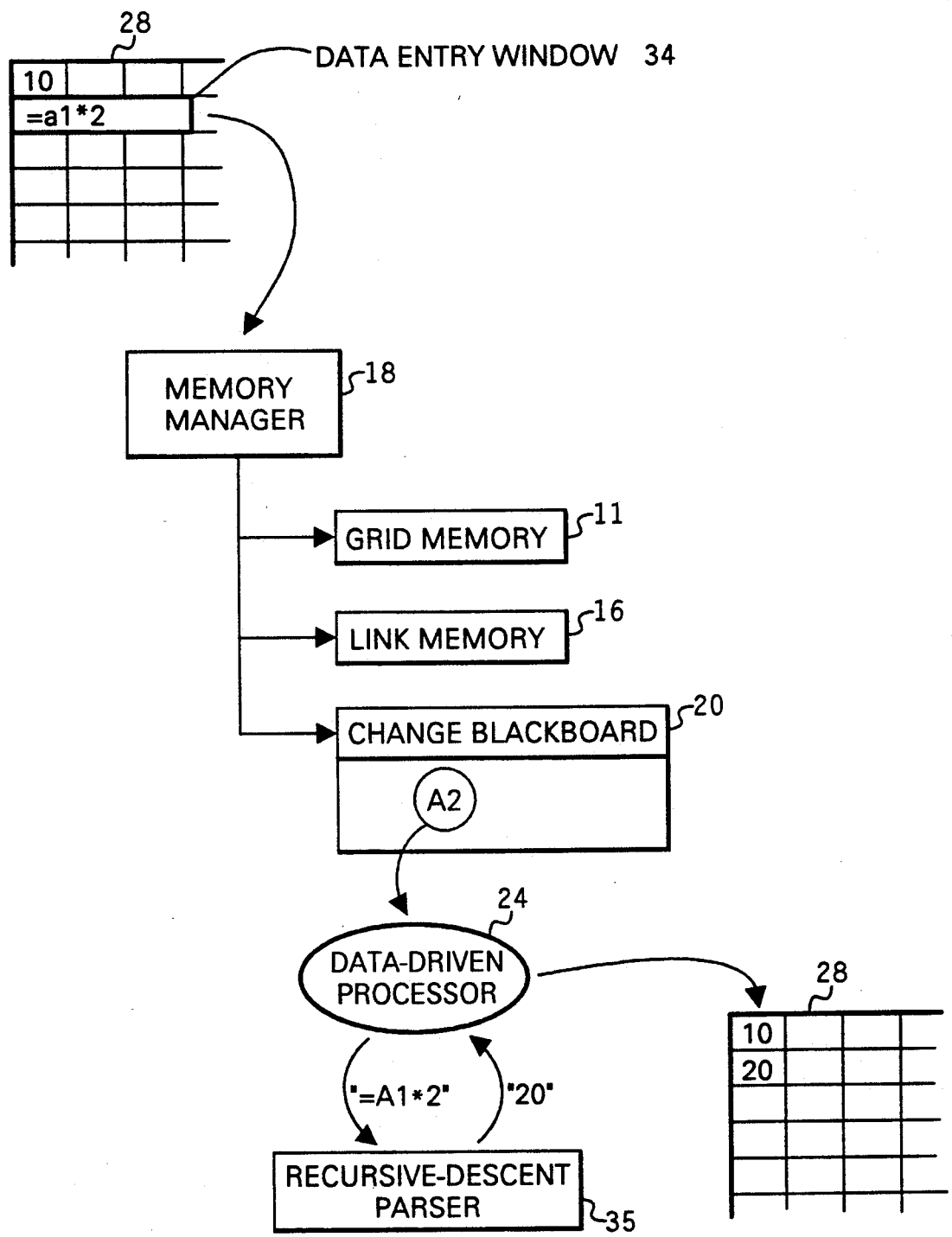
FIG. 3 is a flow diagram illustrating how the blocks of FIG. 1 interact.

FIGS. 2-4 illustrate how the programming system performs direct information entry and cell area adjustment. In FIG. 4, grid display unit 32 has displayed grid 28. As a user begins typing into a cell such as cell A2, a data entry window 34 is superimposed over the cell by interface 14 to capture the information. Cell tracking unit 30 positions the cursor to the right of the within the window 34. The data entry unit 31 detects the number of characters entered and causes the window 34 to grow to accommodate the character string. After the user completes entry by pressing the Return key on the keyboard, the controller 29 sends the information to the memory manager 18. The memory manager first stores the newly entered information in grid memory 11. If the entered information contains a cell reference such as "=A1*2," the cell reference is extracted to create connections in link memory 16. In the example of FIG. 3, the address "A1" is extracted from the information for creating a connection between cells A2 and A1. Cell addresses are extracted by a conventional recursive-descent parser 35.

Once information is stored within a cell, a change in its value is recorded in change blackboard 20. For example, cell A2 immediately changes from a formula to data because cell A1 contains a number to be multiplied. This change is recorded in blackboard 20. With information entry complete, data-driven processor 24 is then invoked to calculate the new value for cell A2. For this calculation it also calls the recursive-descent parser 35. The processor 24 then sends the new value to the interface 14 for display on the grid 28.

Figure 5:
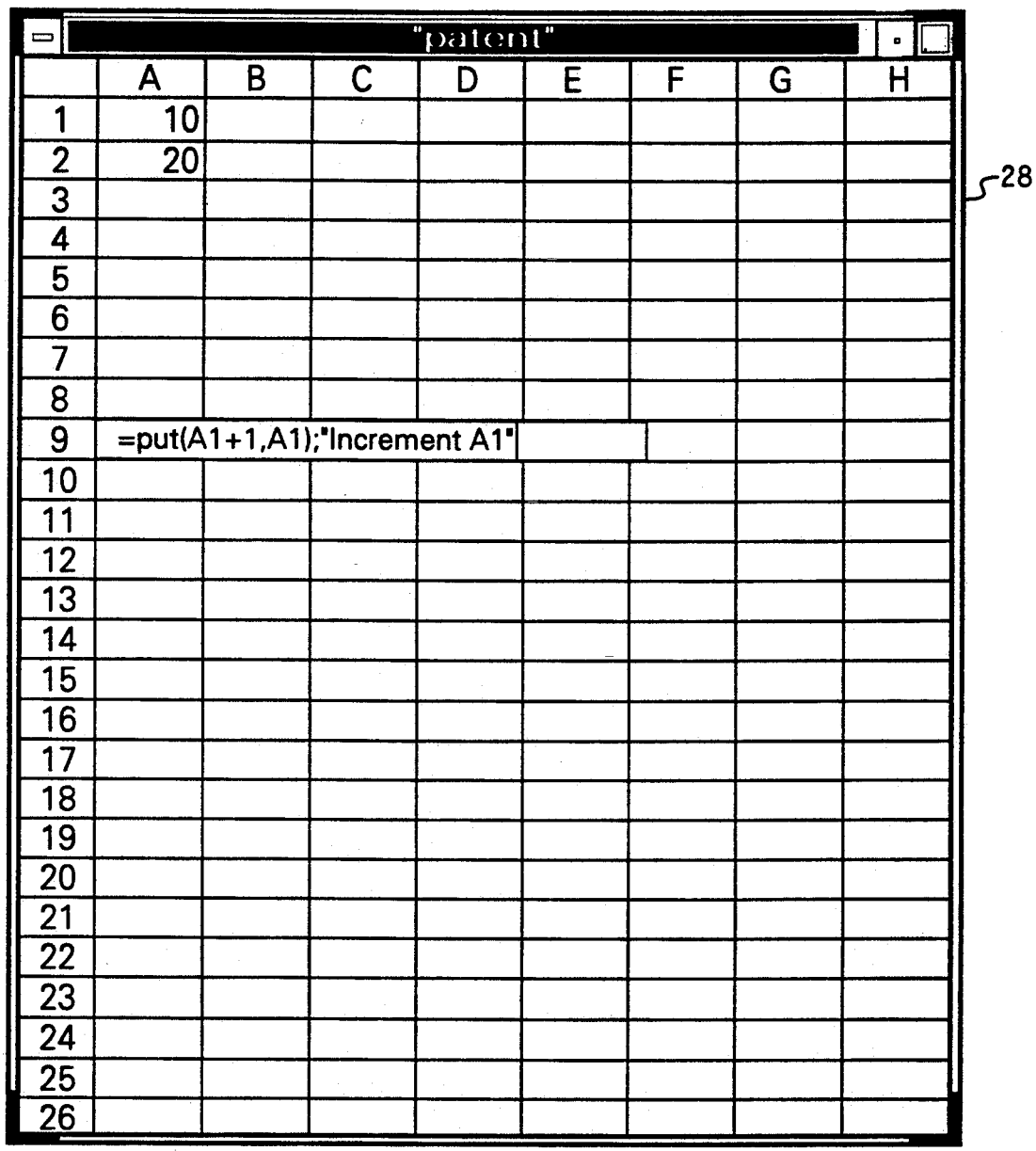
FIG. 5 is a screen display illustrating the modification of information within a memory element into an action.

As mentioned above, formulas such as the function "=put(A1+1,A1)" (which increments the value of cell A1) normally execute automatically once they are entered. Formulas, however, can be modified into actions, which execute only when independently initiated by the user or another process. This may be desirable, for example, where the user wishes to count the number of occurrences of an event. Referring to FIG. 5, the above formula is shown entered and displayed in cell A9. The formula is modified into an action by entering the character ";" after the formula. A label such as "Increment A1" may be added to the action. An action label is displayed over the cell by the grid display unit 32 and parser 35 upon information entry.

Figure 6:
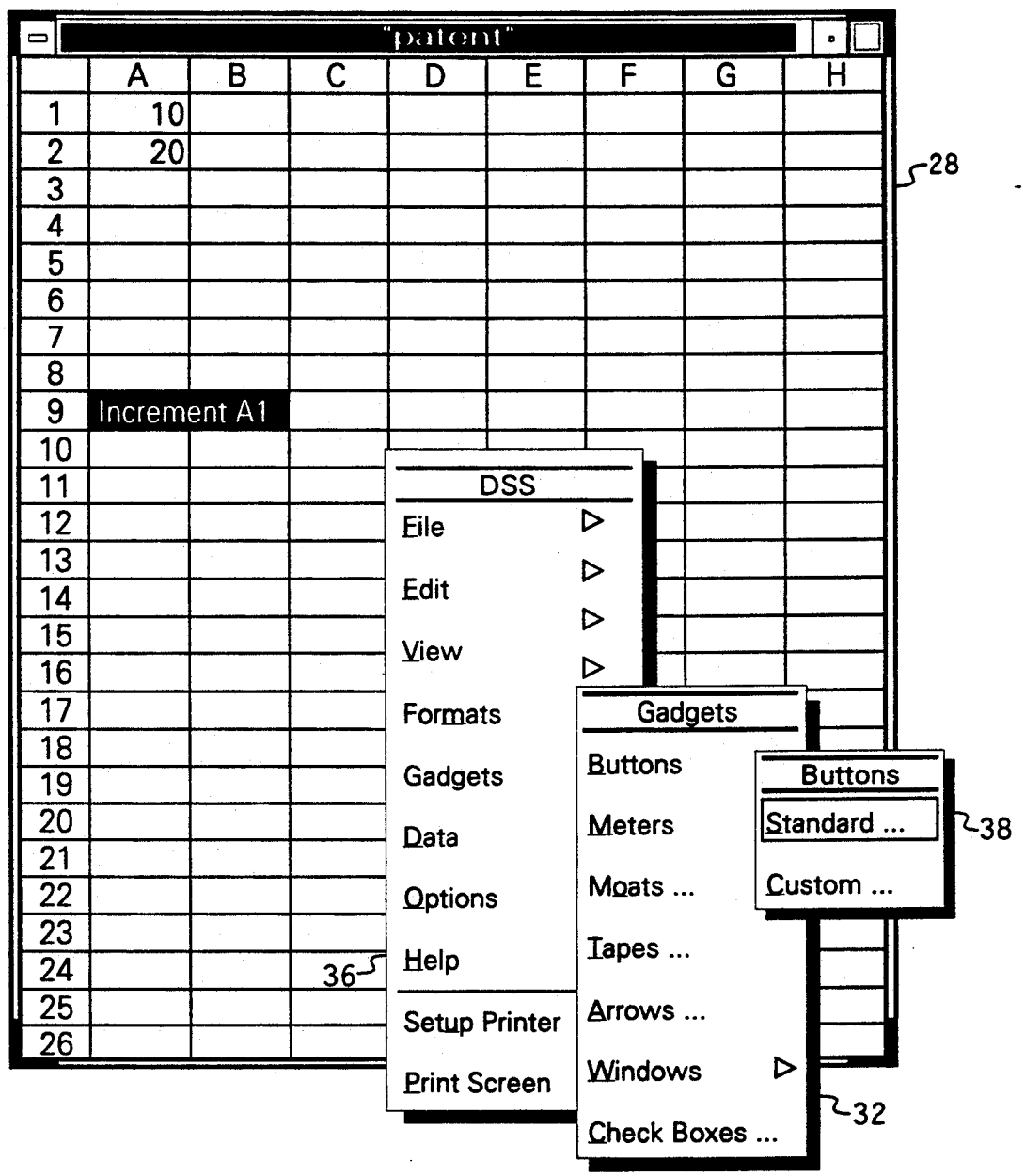
FIG. 6 is a screen display illustrating how the user interface of the programming system may be invoked for displaying the action as a graphical object.

The interface 14 is constructed with options for displaying a cell containing an action as a graphical object. Referring to FIG. 6, pop-up menus 36 and 37 allow a user to select graphical objects in place of the rectangular cells. These menus are generated by the grid display unit 32. Pop-up menu 36 contains the menus of bar 26, and pop-up menu 37 contains submenus for the menu selected from pop-up menu 36, In FIG. 6 standard buttons from a third pop-up menu 38 are shown selected via Gadgets in menu 37. A list window 40 displaying such buttons appears in response in FIG. 7. With the cursor a user then selects a button such as button 41 from the list. This selection causes grid display unit 32 to call one of the object drawing modules 33 representing the selection. Module 33 then places the corresponding graphical object in the selected cell A9, as shown. Unlike conventional list windows, however, window 40 does not disappear once an object has been selected from its list. Instead, the displayed list remains visible for further selection until manually removed by selecting the cancel button 42.

To modify formulas into actions, memory manager 18 through parser 35 recognizes a desired modification by the presence of the character ";." An action is handled as any other formula, constant or function in grid memory 11 and link memory 16, but the label portion is stored in a separate character buffer. When the grid 28 is again displayed, the interface 14 is programmed to display only the label. The memory manager 18 marks actions to distinguish them from other formulas and functions in the change blackboard 20. This mark is detected by the data-driven processor 24 when it reads the blackboard for calculating new cell values. The processor 24 ignores actions and does not calculate new values for the associated cells.

Figure 7:
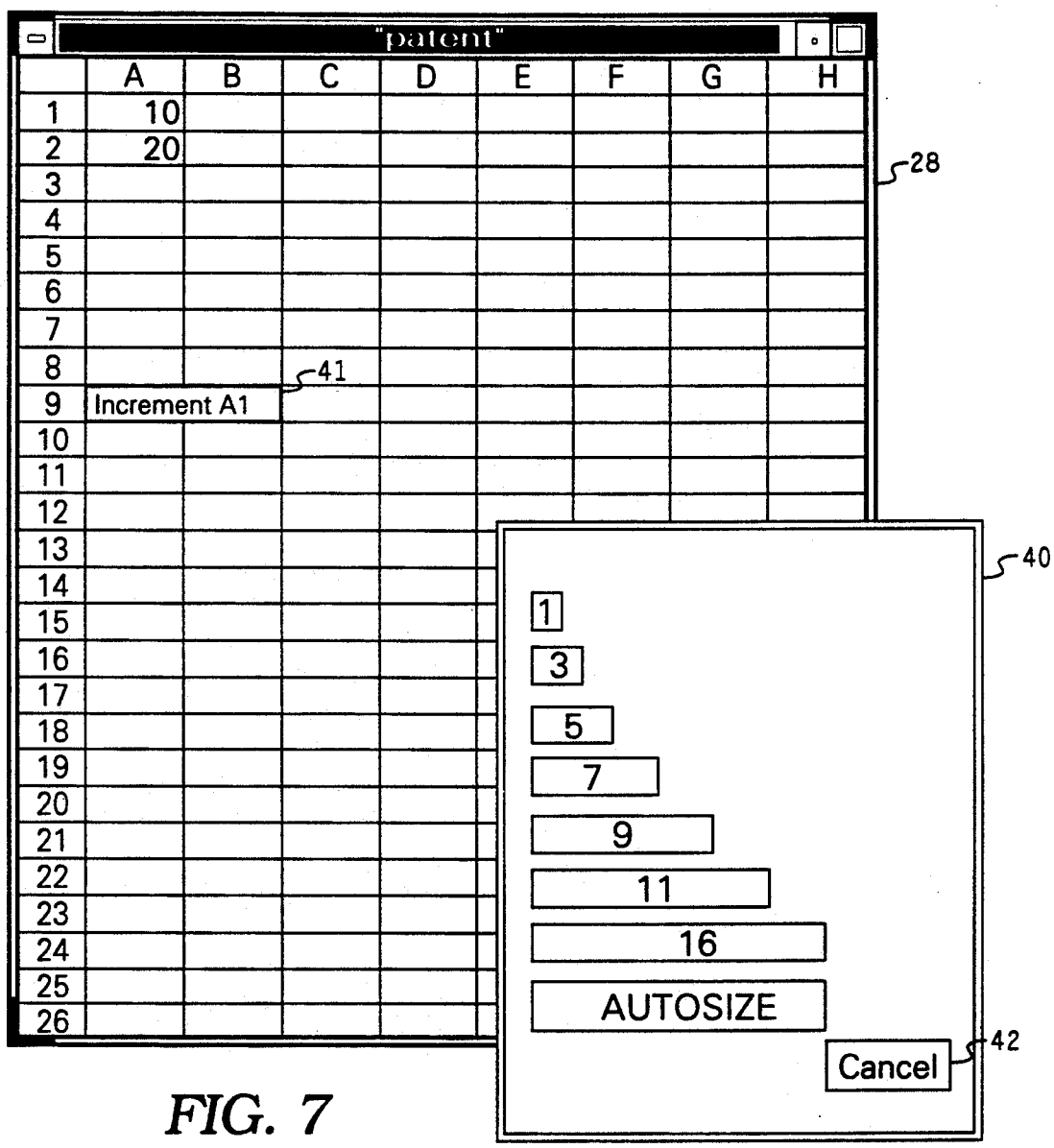
FIG. 7 is a screen display illustrating the action as a graphical object.

If a graphical object is added to a cell, as shown in FIG. 7, that information is also stored in the cell. The enlarged view of a memory element in FIG. 1 illustrates this addition to the cell information.

When an action is independently initiated via the cursor or by another process, the action is sent by the memory manager 18 from grid memory 11 to sequential processor 22 for execution. A sequential processor is a means for modifying entered information entered into an action that executes only upon independent initiation. Any memory changes that result are recorded on the change blackboard 20 in the usual manner. Once the sequential processor 22 completes execution, the data-driven processor 24 is invoked to make any calculations based on the newly recorded memory changes.

Figure 8:
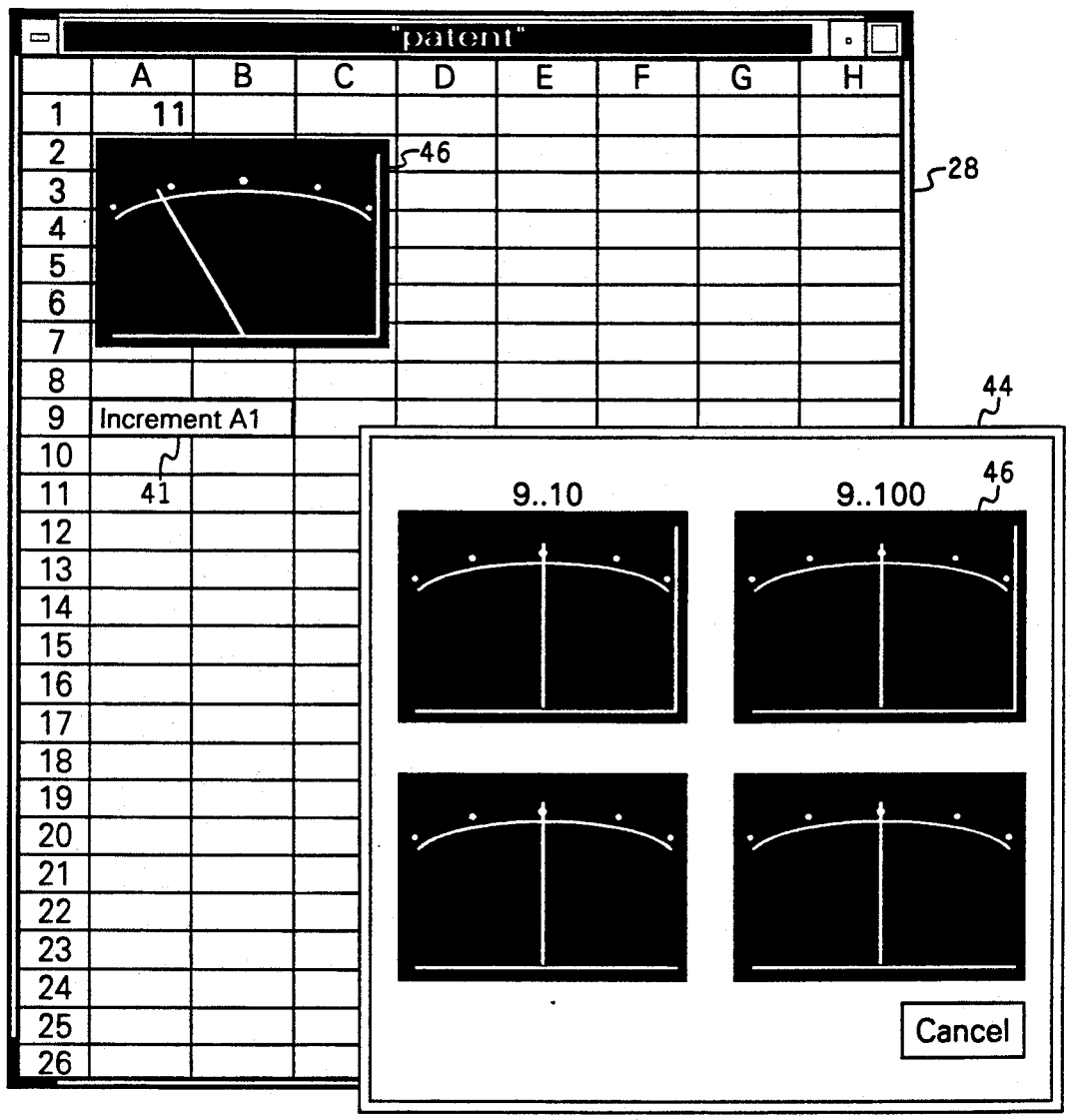
FIG. 8 is a screen display illustrating data within a memory element in graphical form.

Data may be displayed graphically. FIG. 3 shows that the cell A2, with the formula "=A1*2," is set equal to twice the value of cell A1. This information may be displayed graphically via pop-up menus 36 and 37 shown in FIG. 6. Cell A2 is first selected. This time, however, assume the Meters menu was then selected in menu 37. The result is shown in FIG. 8. A list window 44 appears in response with a list of analog meters. The upper right meter 46, with a range of zero to one hundred, was selected and appears over cell A2. In many cases, as here, the object area exceeds the cell size. If a cell contains a graphical object larger than its area, the object is displayed to the extent possible in empty cells to the right of and below the selected cell.

Watchers

Figure 9:
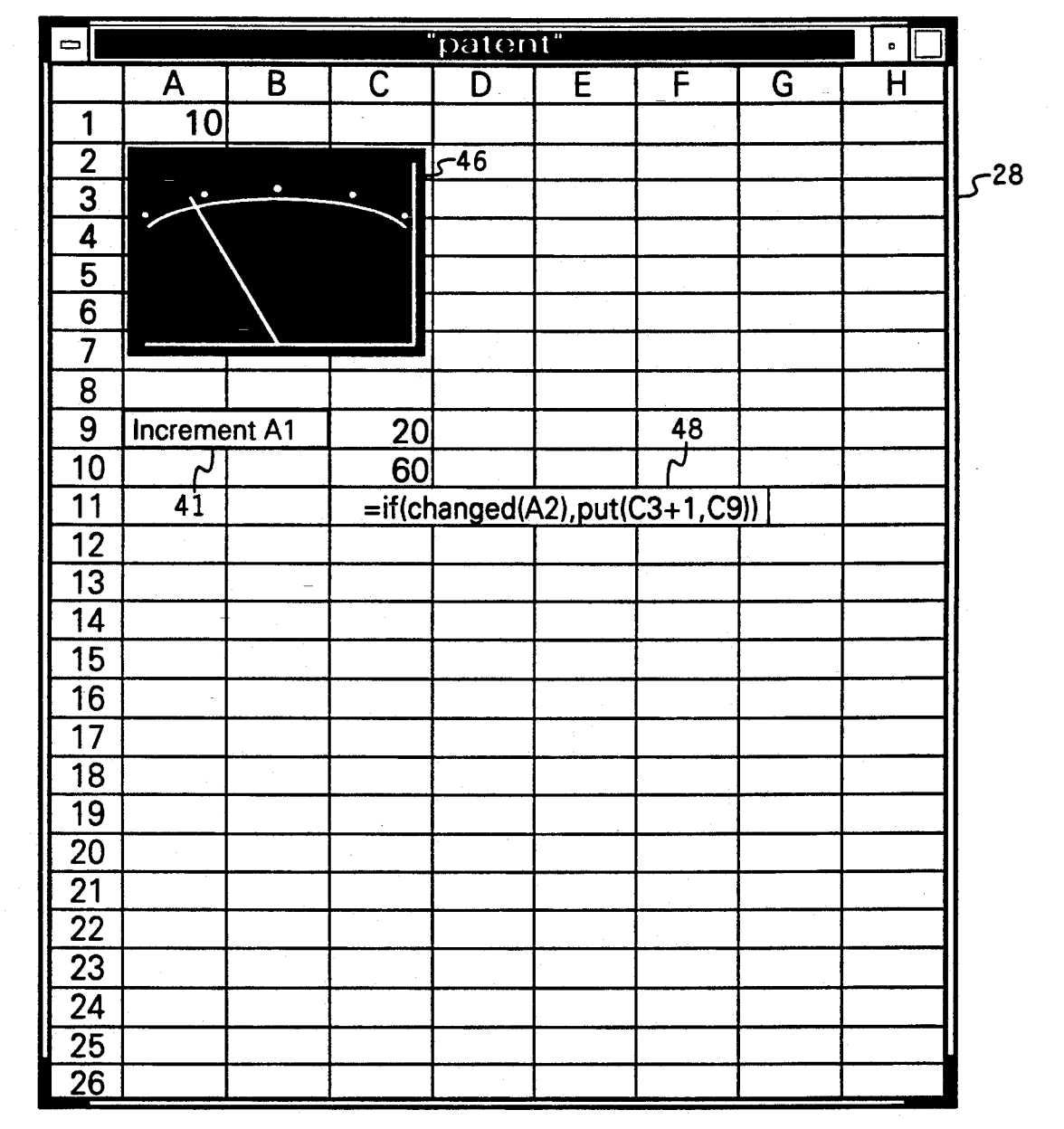
Figure 10:
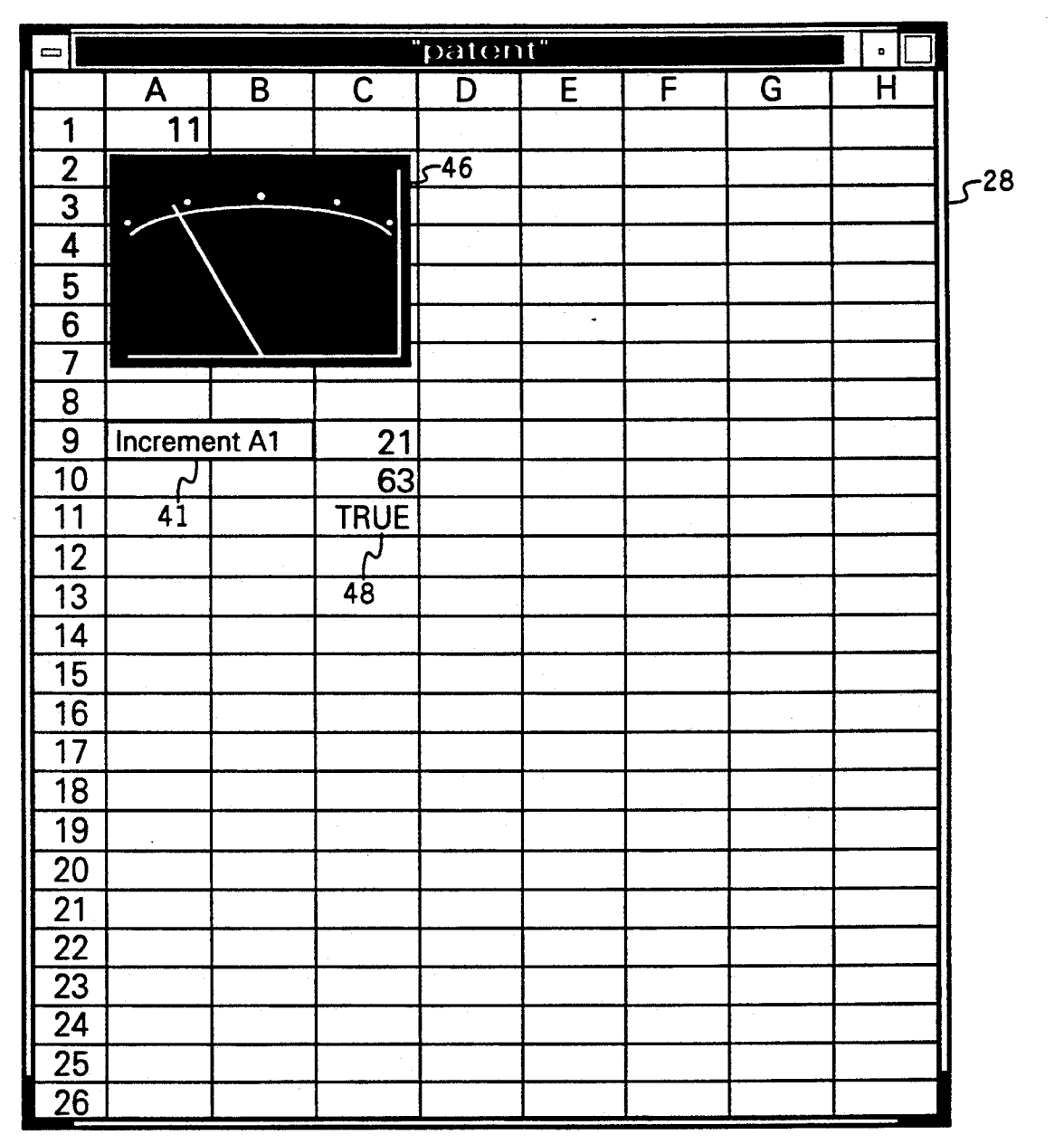

In conventional spreadsheets formulas and functions calculate data. Functions that perform a procedure such as incrementing a variable are not supported. The present programming system is more versatile. It has the capability to execute conditional functions that perform a procedure upon the occurrence of an event. These functions are referred to as "watchers" because they monitor or watch data for a specific condition and execute only when such condition occurs. For example, FIG. 9 shows a watcher 48 displayed in cell C11. The watcher increments the value of cell C9 only if the value of cell A2 changes. In the example of FIGS. 2-9, cell A2 has twice the value of cell A1 and changes only if the action button 41 is pressed. A watcher, because it is a function, also returns a value to its cell. This value becomes TRUE once the condition is met and the function executes, as shown in FIG. 10.

For the data-driven processor 24 to perform calculations, a number of variables and linked lists are provided in the graphical programming system. These include the variables CYCLE START and CLOCK and single unordered linked lists EDITS and FORMULA. The method employed by processor 24 is applied to both conventional formulas and watchers. It is best understood by the following example program, where the cells of the grid 28 contain the information shown in FIGS. 2-9:

A1: 10
A2: =A1*2
A9: =put(A1+1,A1);'Increment A1'
C9: 20
C10: =C9*3
C11: =if(changed(A2),put(C9+1,C9))

Additionally, several of the cells contain graphical object information. FIG. 10 shows the overall appearance of the graphical program. The program's appearance can be further improved by turning off the display of the grid 28 and watcher 48.

Initially change blackboard 20 is clear and the EDITS list and FORMULA list are empty. CYCLE START is set equal to CLOCK. Pressing action button 4 in cell A9 causes cell A1 to change from 10 to 11. This causes CLOCK to increment and puts all cells with changed values on the EDITS list. If no cells are placed on the list, the method ends. However, here the value of cell A1 has changed and it is placed on the EDITS list. CLOCK is now set equal to CYCLE START.

All cells that make reference to cells on the EDITS list are found through a recursive depth-first search of link memory 16 and are placed on the FORMULA list. At this point in the example the variables and list contain the following:
CYCLE START: 1
CLOCK: 2
EDITS list: A1
FORMULA list: A2, C11

The cells on the EDITS list are then removed and CLOCK is increment to three:
CYCLE START: 1
CLOCK: 3
EDITS list:
FORMULA list: A2, C11

Processor 24 now calculates values for all cells on the FORMULA list using the two symbol look ahead recursive descent parser 35. When C11 is calculated, it causes C9 to increment since A2 has changed. Cells A2 and C11 are then marked with the current CLOCK value to indicate that new values for them have been calculated this cycle. C9 is added to the EDITS list since its value changed as a result of a calculation:
CYCLE START: 1
CLOCK: 3
EDITS list: C9
FORMULA list: A2, C11

CLOCK is again incremented and all cells are removed from the FORMULA list:
CYCLE START: 1
CLOCK: 4
EDITS list: C9
FORMULA list:

The method now loops back to repeat the above steps of determining if the EDITS list is empty, proceeding if it is not, etc. Cell C9 is on the EDITS list and cells C10 and C11 make reference to it:
CYCLE START: 1
CLOCK: 2
EDITS list: C9
FORMULA list: C10, C11

All cells are then removed from the EDITS list, CLOCK is incremented, and processor 24 proceeds to calculate new values for cells on the FORMULA list:
CYCLE START: 1
CLOCK: 3
EDITS list:
FORMULA list: C10, C11

However, C11 will not be recalculated because it was marked previously with the current CLOCK value, three. Cell C10 is calculated and marked. CLOCK is again incremented and all cells are removed from the FORMULA list:
CYCLE START: 1
CLOCK: 4
EDITS list:
FORMULA list:

The method again looks to the EDITS list for changed cells. But this time none exist and the method ends.

On the next invocation of the data-driven processor 24, CYCLE START will be set to the current CLOCK value of four. Since all formulas appearing in this example were marked with three, they can be calculated again if a cell they refer to changes.

I have illustrated and described the principles of the invention in a preferred embodiment. This embodiment is but one example, and it should be apparent to those skilled in the art that the invention can be modified in arrangement and detail without departing from such principles. I claim all such equivalents and modifications coming within the scope of the following claims.

I claim:

1. A graphical programming system, comprising:
   an array of memory elements, each element for storing information;
   means for displaying the memory elements as display areas of an initial size on a grid and for displaying options for manipulating the elements;
   means for displaying a cursor over a memory element as information is entered therein;
   entry means for entering information directly into a selected memory element;
   means for displaying information within the memory element as the information is entered; and means for adjusting the size of the display area of the memory element, if necessary, to provide for simultaneous display of all of the entered information within the area of the memory element.

2. The programing system of claim 1 wherein the display area of a memory element has length and width and the adjusting means comprises means for extending the length of the display area.

3. The programming system of claim 1 wherein the entry means comprises means for positioning the cursor over the displayed memory element at a point where information is to be entered.

4. The programming system of claim 1 wherein the array of memory elements comprises cells of a spreadsheet.

5. The programming system of claim 1 including means for displaying a menu bar for listing options and windows for displaying specific choices under each option, a window appearing in response to selection of an option from the menu bar.

6. In a program system having an array of memory elements each capable of storing information including functions, a method of executing a conditional function, comprising:
   putting on a first list a memory element whose value has been changed;
   putting on a second list a memory element having a conditional function which refers to a memory element on the first list;
   removing the memory element from the first list;
   calculating the conditional function;
   changing the value of any memory element as required by the conditional function;
   putting on the first list a memory element whose value has been changed by the conditional function; and
   repeating the rest of the above cycle of steps until a conditional function no longer changes the value of a memory location, thereby causing the first list to remain empty.

7. The method of claim 6 including marking a conditional function once it has been calculated to prevent its recalculation until first list is empty and the method ends.

8. A computer-assisted method for assisting a user in entering information into a spreadsheet-based graphical programming system, the system including an array of memory elements represented as cells on a display device, comprising:
   displaying an array of cells on the display device, each cell having a display area of an initial size;
   providing a cursor for selecting a cell for the entry of characters therein;

displaying entered characters directly in the display area of a selected cell; and adjusting the size of the display area of the cell, if necessary, to provide for simultaneous display of all of the entered characters within the area as the characters are entered.

9. The method of claim 8 wherein adjusting the display area comprises extending the length of the cell to accommodate additional characters.

10. The method of claim 8 including reducing the display area of the cell to its original size once character entry is complete.

* * * * *